Oct. 12, 1926.
H. BROOCK,
AUTOMOBILE BUMPER
Filed Dec. 26, 1924   2 Sheets-Sheet 1
1,603,232
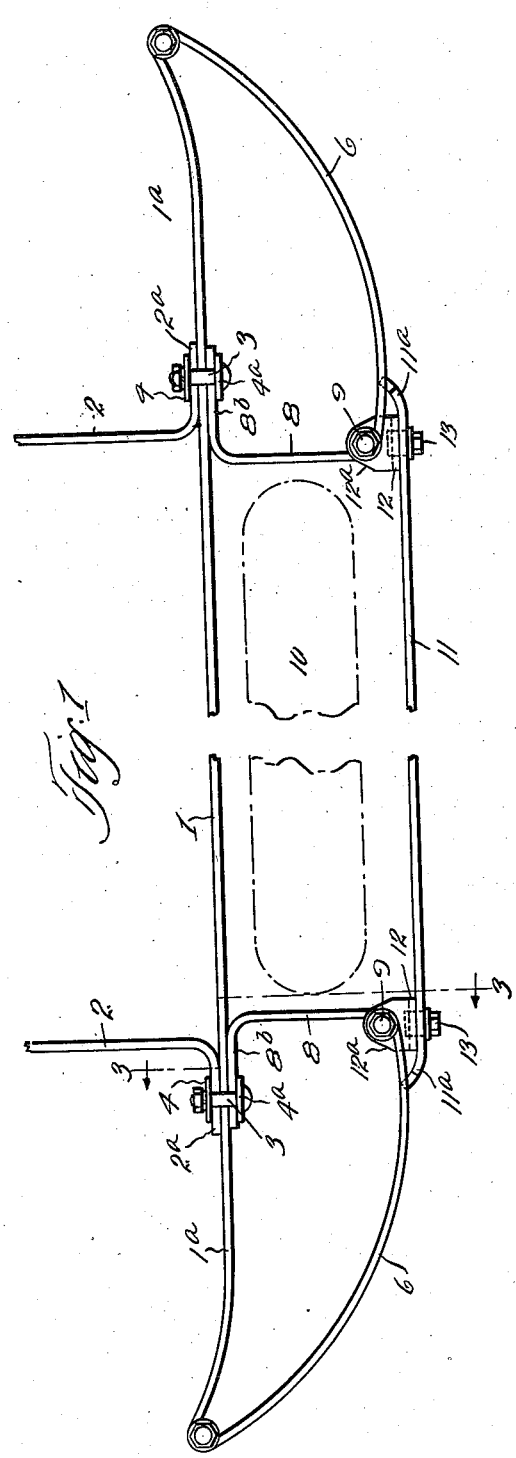
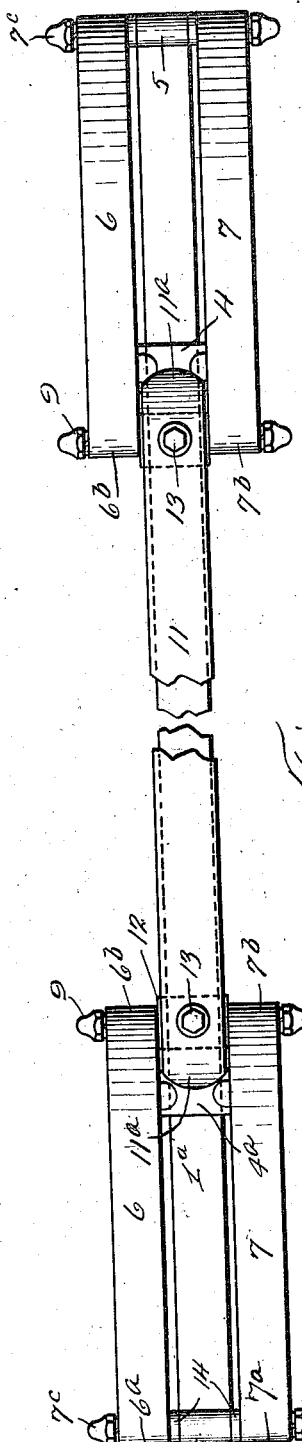
Inventor
Harold Broock,
By Hull, Brock & West
Attys Oct. 12, 1926.
H. BROOCK
AUTOMOBILE BUMPER
Filed Dec. 26, 1924    2 Sheets-Sheet 2
1,603,232
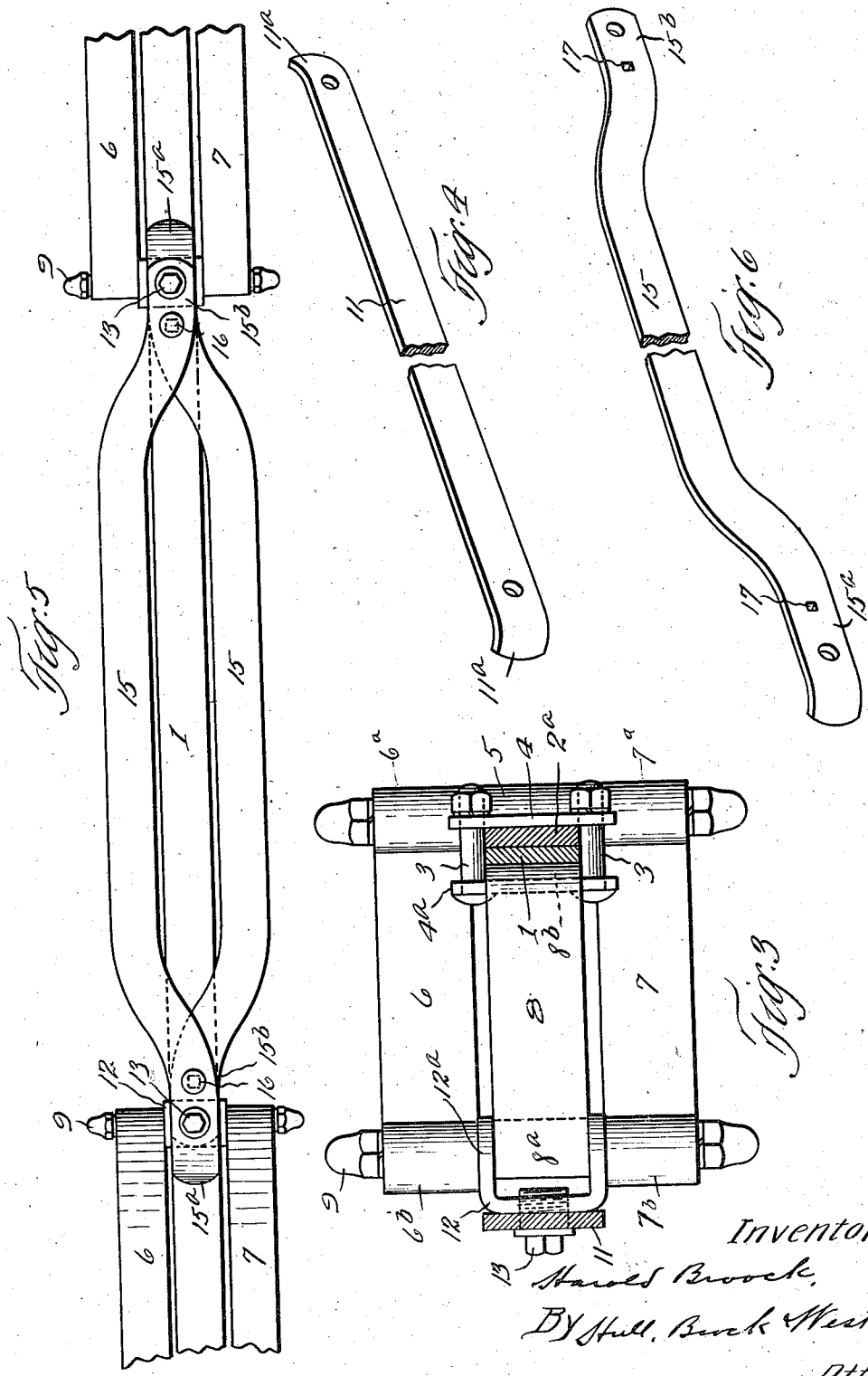
Inventor
Harold Broock,
By Hull, Buck & West.
Attys.

Patented Oct. 12, 1926.

1,603,232

UNITED STATES PATENT OFFICE.

HAROLD BROOCK, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed December 26, 1924. Serial No. 758,256.

This invention relates to automobile bumpers and more particularly to bumpers which are adapted to be applied to the rear of automobiles for the protection of the fenders and which are constructed to accommodate and permit the convenient handling of a spare tire. The invention herein is particularly well adapted for use in connection with rear bumpers such as shown in the patent to Christian Girl and Wayne E. Dunston, No. 1,476,605, issued December 4, 1923.

It is the general purpose and object of the invention to provide a bumper of the character referred to with a central section which is capable of being conveniently applied to the rear of the fender-guard members and which is so mounted as to enable it to be readily swung out of the way to permit access to the space provided between the said members and to a spare tire within such space.

Further and more limited objects of the invention will appear hereinafter and will be realized in and through the combinations of elements embodied in the claims hereof.

In the drawings, Fig. 1 represents a plan view of a bumper and its supporting arms, the said bumper embodying my invention; Fig. 2 an elevation of said bumper; Fig. 3 a sectional detail corresponding to the line 3—3 of Fig. 1; Fig. 4 a detail in perspective of the central movable bumper section; Fig. 5 a view, similar to Fig. 2, of a modified form of my invention; and Fig. 6 a detail in perspective of one of the attached bars employed with and constituting part of the movable central bumper section shown in Fig. 5.

For convenience of description, the bumper will be assumed to be in the position which it occupies when applied to the rear end of an automobile, and the terms "front" and "rear" will be used in furtherance of such convenient designation, but without any intention of necessarily limiting the application of the bumper to any particular part of the vehicle.

Describing the parts by reference characters, 1 denotes a cross bar adapted to extend across the rear of an automobile and the fenders thereof and supported in any convenient manner from the rear ends of the side members of such vehicle, the particular means shown herein being arms 2 extending rearwardly from such side members (not shown) and having their rear ends deflected so as to bear at $2^a$ against the front faces of the front fender-protecting members $1^a$ of the bumper, said members being formed as extensions of and connected by the cross bar 1, the deflected portions $2^a$ being secured to the said members (as well as to the bracing bars, to be referred to hereinafter) by means of bolts 3, arranged above and below the bar 1, and clamping plates 4, $4^a$.

The ends of the members $1^a$ are preferably curved forwardly or toward the vehicle and are provided each with an eye 5.

Associated with the members $1^a$ at each end of the bar 1 are an upper bar 6 and a lower bar 7, each having an eye $6^a$, $7^a$ respectively, which eyes are adapted to receive a bolt $7^c$ extending therethrough and through an eye 5, whereby the bars 6 and 7 are connected to the said members.

The bars 6 and 7 project rearwardly with respect to the members $1^a$ and are then bent slightly forward or toward the cross bar 1, being of sufficient length to extend across and protect the fender adjacent thereto. The inner ends of the bars 6 and 7 are provided with eyes $6^b$, $7^b$, respectively.

8 denotes a pair of bracing bars each having an eye $8^a$ at its rear or outer end which is interposed between the eyes $6^b$ and $7^b$ of the cooperating bars 6 and 7, the bars 6, 7 and 8 being connected by means of bolts 9 extending through such aligned eyes. The front end of each bar 8 is bent outwardly, as shown at $8^b$, whereby it bears against the rear face of an end member $1^a$, and such bent or deflected portion of each of the bars 8 is secured to its cooperating member $1^a$ by means of the bolts 3 and the clamping plates 4, $4^a$, which also serve to connect the arms 2 to the members $1^a$. The space between the fender guard portions 6, 7 and 8 is adapted to receive one or more spare tires, according to the depth of the space, one of such tires being indicated at 10. For the purpose of protecting such tires against impact and of permitting convenient access to such tires and the space therefor, I have provided the bumper just described with a rear central section, shown as a single bar 11 in Figs. 1-4 inclusive. The ends of the bar 11 are of less width than the space between the bars 6 and 7 and are preferably deflected forwardly, as shown at 11ª whereby, when assembled, the extreme forward ends of the rear bar project slightly into the space between the said bars 6 and 7. This shape of the bar 11 prevents the ends from being fouled by an object with which the bumper may contact. Each end of the bar 11 is connected to a U-shaped mounting having a base plate 12 bearing against the front face of such bar and conveniently secured thereto by means of a short bolt 13 extending through the bar and threaded into such base plate. The heads of these bolts are preferably of the same dimensions as the heads of the bolts which are used for securing the demountable rims upon the wheels, thus enabling them to be operated by the same socket-wrench which is employed for the removal and replacement of the tires. From the base plate 12, legs 12ª extend forwardly, between the inner ends of the bars 6 and 7, and the legs of each mounting receive the appropriate bolt 9, the legs being interposed between the eyes 6ᵇ and the eye 8ª. To compensate for the spacing thus provided between the eyes 8ª and 6ᵇ, spacing washers 14 of the same thickness as the legs 12ª are interposed between each eye 5 and the cooperating eyes 6ª and 7ª.

With the parts constructed and arranged as described, it will be evident that, when it is desired to obtain access to the space in front of the bar 11, either of the bolts 13 may be removed, whereupon the bar 11 may be swung about its other end as a pivot. The bar may be replaced in operative relation to such space by merely swinging it into place and screwing the bolt 13 home again in the threaded aperture provided therefor in the base plate 12.

In Figs. 5 and 6 there is shown a modification of my invention wherein the rear central section of the bumper is made by a pair of symmetrical arms each having a central portion 15 which is vertically offset from the ends 15ª and 15ᵇ. It will be noted that the end 15ª of each bar is longer than the end 15ᵇ and is forwardly curved. In assembling, the bars are reversed, end for end, which will provide a widened impact section having at each end an elongated forwardly projecting end portion 15ª, which end portion projects slightly into the space between the bars 6 and 7. The bars are secured together in the position shown in Fig. 5 by means of carriage bolts 16 extending through the square apertures 17 in the overlapping parts of said bars. The central section thus formed is mounted between the inner ends of the bars 6 and 7 in the same manner as the central section 11, the bolts 13 in this case extending through both overlapped end portions 15ª and 15ᵇ.

Through the construction and arrangement of parts shown and described herein, a combined rear bumper and fender guard structure is produced which will not only protect the fenders in an efficient manner but also the tire within the space in front of the bars 11 and 15 and between the bars 6 and 7. Furthermore, the central section can be produced and sold as an attachment for use in connection with existing fender guards having no such central section.

Having thus described my invention, what I claim is:—

1. The combination, with a pair of fender guards each comprising a pair of vertically spaced bars adapted to extend across and protect a fender, of a central bumper section having an end pivotally supported between one such pair of bars and its other end detachably connected to the opposite pair of bars.

2. The combination, with a pair of fender guards each comprising a pair of vertically spaced bars adapted to extend across and protect a fender, of a central bumper bar having an end pivotally supported from the inner ends of one such pair of bars and its other end detachably connected to the inner ends of the opposite pair of bars.

3. The combination, with a pair of fender guards each comprising a pair of vertically spaced bars adapted to extend across and protect a fender, of a central bumper section, and supporting means for such section extending between the inner ends of each such pair of bars and pivotally connected thereto.

4. The combination, with a pair of fender guards each comprising a pair of vertically spaced bars adapted to extend across and protect a fender, of a central bumper section, and a pivotal mounting for one end of said section extending between and pivotally connected to one such pair of bars, and means removably connecting the opposite end of said section to the other pair of bars.

5. The combination, with a pair of fender guards each comprising a pair of vertically spaced bars adapted to extend across and protect a fender, of a central bumper section adapted to be extended across the rear of the space between such fender guards and pivotally connected at one end to and between a pair of bars and having its other end removably connected to the other pair of bars, the extreme ends of such section being deflected toward the fender-guard bars.

6. The combination, with a pair of fender guards each comprising a pair of vertically spaced bars adapted to extend across and protect a fender, of a central bumper section adapted to be extended across the rear of the space between such fender guards and pivotally connected at one end to and between a pair of bars and having its other end removably connected to the other pair of bars, the extreme ends of such section being deflected toward and between the fender guard bars.

7. A bumper comprising a pair of front members each adapted to extend in operative relation to a fender, an upper and a lower bar connected to the outer end of each of the said members and projecting inwardly and rearwardly from such end, each of said bars having an eye at its inner end, a brace bar having an eye interposed between the aligned eyes at the inner ends of each pair of bars and each having its front end connected to the corresponding end member, a central bumper section adapted to extend across the space between the inner ends of the opposed pairs of bars, a pivotal mounting member detachably secured to each end of the said intermediate or central section and having legs projecting forwardly therefrom, the said legs adapted to be inserted between the eyes at the inner ends of the cooperating pairs of bars and the eyes on the rear ends of the cooperating brace bars, and bolts extending through said eyes and through the legs of the said mounting members.

8. A bumper comprising a pair of front members each adapted to extend in operative relation to a fender, an upper and a lower bar connected to the outer end of each of the said members and projecting inwardly and rearwardly from such end, each of said bars having an eye at its inner end, a brace bar having an eye interposed between the aligned eyes at the inner ends of each pair of bars and each having its front end connected to the corresponding end member, a central bumper section adapted to extend across the space between the inner ends of the opposed pairs of bars, a pivotal mounting member detachably secured to one end of the said intermediate or central section and having legs projecting forwardly therefrom, the said legs adapted to be inserted between the eyes at the inner ends of the cooperating pair of bars and the eye on the rear end of the cooperating brace bar, a bolt extending through said eyes and through the front legs of the said mounting member, and means for detachably securing the other end of said section to the opposite pair of bars.

9. The combination, with a pair of fender guards comprising each a pair of vertically spaced bars extending inwardly and rearwardly from a point adjacent to the outer edge of a fender and providing a space between such inner ends for the reception of a tire, of a central bumper section having a mounting member detachably connected thereto, each such member extending between and being connected to the inner ends of the cooperating bars.

10. The combination, with a pair of fender guards having their inner ends spaced apart to provide a tire-receiving space, of a bumper section adapted to extend across the space between the inner ends of such guards, the said section comprising a pair of symmetrical bars, the ends of one of said bars being secured to the other bar and the intermediate portions of the said bars being offset in opposite vertical directions, and means for securing the ends of such intermediate section to the inner ends of the said fender guards.

11. The combination, with a pair of fender guards each comprising an upper and a lower bar extending rearwardly and inwardly from a point adjacent to the outer portion of the fender, the inner ends of one pair of bars being spaced from the inner ends of the other pair of bars, of an intermediate bumper section comprising a pair of symmetrical bars, the ends of one of said bars being secured to the ends of the other bar and the intermediate portions of the said bars being offset in opposite vertical directions, means for pivotally securing one end of such intermediate section to and between the ends of one of such pair of bars, and means for detachably securing the opposite end of such section to and between the inner ends of the opposite pair of bars.

12. The combination, with a pair of fender guards each having an upper and a lower bar arranged to extend across and protect a fender, of an intermediate bumper section adapted to extend across the space between the inner ends of the opposed pairs of fender-guard bars and to be secured thereto, the said intermediate bumper section comprising a pair of symmetrical bars each having a relatively long and curved end and a relatively short end and means securing the said bars together with the short end of one bar on top of the long end of the other and the long end of such bar on top of the short end of such other bar, the intermediate portions of said bars projecting in opposite vertical directions from their points of attachment, and means for securing the curved ends of the said symmetrical bars to and between the inner end of the opposed pairs of fender guard bars.

13. The combination, with a pair of fender guards each comprising an upper and a lower bar extending rearwardly and inwardly from a point adjacent to the outer portion of the fender, the inner ends of one pair of bars being spaced from the inner ends of the other pair of bars and each of said bars having an eye at its inner end, of means for supporting the inner ends of the said bars thereby to provide a space between such pairs of bars for the reception of a tire, an intermediate bumper section adapted to extend across the space between the inner ends of said pairs of bars, a U-shaped mounting member bearing against the inner face of the said bumper section adjacent to each end thereof and each such member having a pair of inwardly extending legs adapted to be inserted between the eyes of an adjacent pair of bars, a bolt extending through each end of the said bumper section and into the base of each such mounting member, and bolts extending through the aligned eyes of each pair of bars and through the legs of the adjacent mounting member.

14. A bumper comprising a pair of end members, a pair of bars at the outer end of each such member, the bars of each pair being located respectively above and below the cooperating end of its end member and connected thereto, the said bars extending inwardly and rearwardly from their points of connection with the first members and each having an eye at the inner end thereof, a pair of brace bars each having an eye interposed between the aligned eyes at the inner ends of each pair of bars and each extending forwardly and bearing against the cooperating end member, and means for securing the front ends of the brace bars to the said members.

15. A bumper comprising a front bar, a pair of bars at each end of the front bar, the bars of each pair being located respectively above and below the cooperating end of the first bar and connected thereto, the second mentioned bars extending inwardly and rearwardly from their points of connection with the front bar and each having an eye at the inner end thereof, a pair of brace bars each having an eye interposed between tht aligned eyes at the inner ends of each pair of second mentioned bars and each extending forwardly and bearing against the front bar, supporting arms each having a portion bearing against the front bar, and common means for securing such portions of the said arms and the forward end portions of the brace bars to the front bar.

16. The combination, with a pair of fender guards each comprising a pair of vertically spaced bars adapted to extend across and protect a fender, of a central bumper bar having an end pivotally supported from one such pair of bars and its other end detachably connected to the opposite pair of bars.

In testimony whereof, I hereunto affix my signature.

HAROLD BROOCK.